(12) United States Patent
Haider et al.

(10) Patent No.: US 11,418,247 B2
(45) Date of Patent: Aug. 16, 2022

(54) HIGH SPATIAL REUSE FOR MMWAVE WI-FI

(71) Applicant: HEWLETT PACKARD ENTERPRISE DEVELOPMENT LP, Houston, TX (US)

(72) Inventors: Muhammad Kumail Haider, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/916,240

(22) Filed: Jun. 30, 2020

(65) Prior Publication Data
US 2021/0409089 A1 Dec. 30, 2021

(51) Int. Cl.
*H04B 7/06* (2006.01)
*H04W 16/28* (2009.01)
(Continued)

(52) U.S. Cl.
CPC ......... *H04B 7/0695* (2013.01); *H04B 17/364* (2015.01); *H04W 16/28* (2013.01); *H04W 84/12* (2013.01); *H04W 88/08* (2013.01)

(58) Field of Classification Search
CPC ..... G01S 1/54; G01S 5/02; G01S 5/10; G01S 7/295; G01S 13/74; H04B 7/02;
(Continued)

(56) References Cited

U.S. PATENT DOCUMENTS 8,527,693 B2   9/2013 Flynn et al.
2009/0232116 A1   9/2009 Li et al.
(Continued)

FOREIGN PATENT DOCUMENTS

WO   2013/048490 A1   4/2013

OTHER PUBLICATIONS

Al-Falahy et al., "Network Capacity Optimisation in Millimetre Wave Band Using Fractional Frequency Reuse", IEEE Access, vol. 6, n Mar. 15, 2018, p. 10924-10932.
(Continued)

*Primary Examiner* — Shawkat M Ali
(74) *Attorney, Agent, or Firm* — Hewlett Packard Enterprise Patent Department

(57) ABSTRACT

Examples described herein provide method and systems for high spatial reuse for mmWave Wi-Fi. Examples may include identifying, by a network device, a plurality of millimeter-wave (mmWave) propagation paths between the network device and a set of neighboring devices including a target neighboring device, based on power delay profiles (PDPs) of beam training frames received by the network device from each of the neighboring devices using a plurality of mmWave beams, and determining, by the network device for each of neighboring devices in the set, an estimated angle of arrival (AoA) of each identified mmWave propagation path between the network device and the neighboring device, based on the PDPs of the received beam training frames from the neighboring device. Examples may include selecting, by the network device, one of the mmWave beams that maximizes a signal to interference and noise ratio (SINR) along the estimated AoA of each identified mmWave propagation path between the network device and the target neighboring device, and communicating, by the network device, with the target neighboring device using the selected mmWave beam.

13 Claims, 7 Drawing Sheets

(51) Int. Cl.
  *H04B 17/364* (2015.01)
  *H04W 88/08* (2009.01)
  *H04W 84/12* (2009.01)

(58) Field of Classification Search
  CPC ... H04B 7/04; H04B 7/06; H04B 7/08; H04B 7/0695; H04B 15/00; H04B 17/27; H04B 17/327; H04B 17/364; H04L 27/00; H04L 29/08; H04L 67/18; H04W 4/02; H04W 16/28; H04W 64/00; H04W 64/003; H04W 72/04; H04W 72/08; H04W 84/00
  USPC ........ 370/252, 338; 375/219, 260, 267, 295, 375/316
  See application file for complete search history.

(56) References Cited

U.S. PATENT DOCUMENTS

| | | | |
|---|---|---|---|
| 2013/0111103 A1 | 5/2013 | Dodson et al. | |
| 2013/0185503 A1 | 7/2013 | Bhatta | |
| 2018/0091947 A1* | 3/2018 | Shirakata | G01S 5/0036 |
| 2020/0186230 A1* | 6/2020 | Solichien | H04B 17/24 |

OTHER PUBLICATIONS

Bielsa et al., "Optimizing mmWave Spatial Reuse: Signal-to-Interference Aware Beamtraining", IEEE 20th International Symposium on "A World of Wireless, Mobile and Multimedia Networks" (WoWMoM), Jun. 10-12, 2019, pp. 1-6.
Fiandrino et al., "Scaling Millimeter-Wave Networks to Dense Deployments and Dynamic Environments", Proceedings of the IEEE | vol. 107, No. 4, Apr. 2019, pp. 732-745.
Jog et al., "Enabling Dense Spatial Reuse in mmWave Networks", SIGCOMM Posters '18, Aug. 20-25, 2018, 3 pages.
Coburn et al., "NV-Heaps: Making Persistent Objects Fast and Safe with Next-Generation, Non-Volatile Memories", ASPLOS'11, Mar. 5-11, 2011, 13 pages.
Elinux.org, "Application Init Optimizations", available online at <https://elinux.org/Application_Init_Optimizations>, May 12, 2009, 5 pages.
Federal Communications Commission, "FCC Takes Steps To Facilitate Mobile Broadband and Next Generation Wireless Technologies in Spectrum Above 24 GHZ", Oct. 22, 2015, 2 pages.
Ghasempour et al., "IEEE 802.11ay: Next-Generation 60 GHz Communication for 100 GB/s Wi-Fi", IEEE Communications Magazine, Dec. 2017, pp. 186-192.
Ghasempour et al., "Multi-Stream Beam-Training for mmWave MIMO Networks", MobiCom '18, Oct. 29-Nov. 2, 2018, 15 pages.
Haider et al., "SearchLight: Tracking Device Mobility using Indoor Luminaries to Adapt 60 GHz Beams", Mobihoc'18, Jun. 26-29, 2018, 10 pages.
IEEE Standards Association, "IEEE Standards 802.11ad-2012, Amendment 3: Enhancements for Very High Throughput in the 60 GHz Band", 2012, 19 pages.
Jog et al., "Many-to-Many Beam Alignment in Millimeter Wave Networks", Proceedings of the 16th USENIX Symposium on Networked Systems Design and Implementation (NSDI '19), Feb. 26-28, 2019, 19 pages.
Pefkianakis et al., "Accurate 3D localization for 60 GHz networks." In Proceedings of the 16th ACM Conference on Embedded Networked Sensor Systems, ACM, 2018, pp. 120-131.
Rappaport et al., "Millimeter Wave Wireless Communications", Pearson Education, Inc, Prentice Hall, Sep. 2014, 80 pages.
Saha et al., "X60: A Programmable Testbed for Wideband 60 GHz WLANs with Phased Arrays", WiNTECH'17, Oct. 20, 2017, 8 pages.
Singh et al., "Blockage and Directivity in 60 GHz Wireless Personal Area Networks: From Cross-Layer Model to Multihop MAC Design", IEEE Journal on Selected Areas in Communications, vol. 27, No. 8, Oct. 2009, pp. 1400-1413.
Steinmetzer et al., "Compressive Millimeter-Wave Sector Selection in Off-the-Shelf IEEE 802.11ad Devices", CoNEXT '17, Incheon, Republic of Korea, 2017, 12 pages.
Sur et al., "Towards Scalable and Ubiquitous Millimeter-Wave Wireless Networks", MobiCom'18, Oct. 29-Nov. 2, 2018, 15 pages.

\* cited by examiner

HIGH SPATIAL REUSE FOR MMWAVE WI-FI

BACKGROUND

In recent years, millimeter-wave (mmWave) communications technology has attracted a great deal of attention from industry. As used herein, the "mmWave" refers to the radio frequency (RF) spectrum between 30 GHz and 300 GHz.

MmWave communications may provide at least the following advantages over communications at frequency bands below 10 GHz. First, mmWave communications offer wider channel bandwidths, and thus higher potential data rates, as compared to sub-10 GHz communications. For instance, 60 GHz Wi-Fi based on IEEE 802.11ad provides channel bandwidths of 2.16 GHz, whereas 5 GHz Wi-Fi based on IEEE 802.11ac provides channel bandwidths of only up to 160 MHz. Moreover, 60 GHz Wi-Fi based on 802.11ad provides a 14 GHz wide spectrum at 60 GHz band and extends achievable data rates to 100 gigabits per second (Gbps), which is more than ten times greater than the data rates achievable by 2.4 and 5 GHz Wi-Fi. In addition, the high directionality of mmWave beams allows mmWave communications to have a smaller interference footprint and support more links in the same frequency channel and spatial resources as compared to sub-10 GHz communications. Furthermore, mmWave communications may avoid the congestion that is experienced in sub-10 GHz communications as more and more devices adopt cellular and Wi-Fi communications in sub-10 GHz bands (e.g., 2.4 GHz, 5 GHz).

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
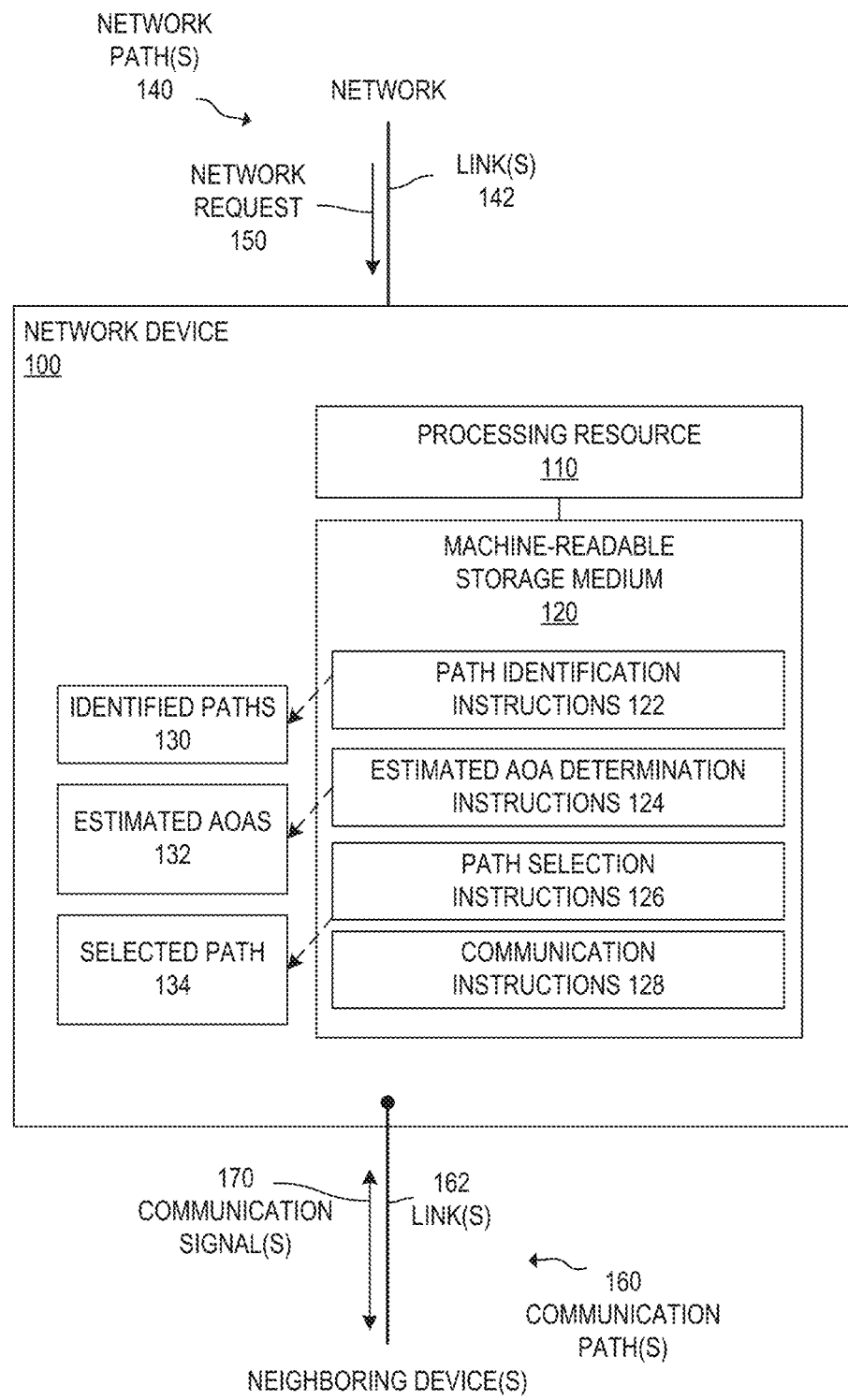
FIG. 1 is a block diagram of an example network device for high spatial reuse for mmWave Wi-Fi.

As noted above, mmWave communications provide higher achievable data rates and wider bandwidths compared to sub-10 GHz communications. Moreover, the highly directional nature of communication links in mmWave bands offer the potential for spatial reuse in mmWave networks by allowing multiple, concurrent mmWave transmissions in the same frequency channel and spatial resources along different spatial directions. As used herein, "spatial reuse" refers to the concurrent use of radio frequency resources (e.g., frequency channels within a given spatial resource) by multiple radios in close proximity (e.g., within coverage range of each other). As used herein, a "spatial resource" refers to a physical area in which wireless transmission (mmWave transmissions) may propagate. Such potential for multi-Gbps data and spatial reuse makes mmWave Wi-Fi an attractive technology to meet the ever-increasing data rate demands of Wi-Fi networks for dense deployments such as airports, stadiums, conference rooms, etc., and also for applications supporting high data rate requirements such as virtual reality and augmented reality, real-time high resolution (e.g., 4K, 8K, etc.) video streaming, wireless displays, etc.

Despite the great potential that mmWave Wi-Fi offers for multi-Gbps data rates and spatial reuse, communication links in the mmWave band are subject to higher free space path loss than sub-10 GHz communication links. To compensate for the effects of such free space path loss, mmWave signals are transmitted via directional beams from antennas or antenna arrays (e.g., using beamforming techniques) to increase the gain of the communication links. However, even when mmWave signals are transmitted via directional beams, these beams have significant side-lobes and other imperfections which can leak (e.g., radiate) energy in unintended directions. These imperfections may lead to inter-link interference between multiple, concurrent mmWave Wi-Fi communication links, which may cause collisions and significant data rate (and throughput) loss, diminish spatial reuse gains, and/or decrease overall network throughput for mmWave Wi-Fi.

To address these issues, examples described herein provide high spatial reuse for mmWave Wi-Fi. Examples described herein include a system and a method to identify, by a network device, a plurality of mmWave propagation paths between the network device and a set of neighboring devices including a target neighboring device, based on power delay profiles (PDPs) of beam training frames received by the network device from each of the neighboring devices using a plurality of mmWave beams, and determine, by the network device for each of neighboring devices in the set, an estimated angle of arrival (AoA) of each identified mmWave propagation path between the network device and the neighboring device, based on the PDPs of the received beam training frames from the neighboring device. Examples described herein include a system and method to select, by the network device, one of the mmWave beams that maximizes a signal to interference and noise ratio (SINR) along the estimated AoA of each identified mmWave propagation path between the network device and the target neighboring device, and communicate, by the network device, with the target neighboring device using the selected mmWave beam.

In this manner, examples described herein may provide high spatial reuse for mmWave Wi-Fi. For instance, examples described herein may identify a plurality of mmWave propagation paths between a network device and a set of neighboring devices including a target neighboring device, and determine, for each of the neighboring devices in the set, an estimated AoA of each identified mmWave propagation path between the network device and the neighboring device, thereby identifying communication paths between the network device and the target neighboring device, identifying interference paths between the network device and other neighboring devices in the set, and determining the spatial directions (e.g., angular directions) of such paths. In addition, examples described herein may select one of the mmWave beams that maximizes a SINR along the estimated AoA of each identified mmWave propagation path between the network device and the target neighboring device, and communicate with the target neighboring device using the selected mmWave beam, thereby providing mmWave communications between the network device and the target neighboring device using a mmWave beam that mitigates inter-link interference along interference paths between the network device and the other neighboring devices in the set that operate in the same frequency channel and spatial resources.

In examples described herein, a "power delay profile" or "PDP" refers to a mapping of an intensity (i.e., signal strength) of a received signal (e.g., received beamforming training frames) via a multipath channel as a function of time delay. The time delay is a difference in travel time between the multipath arrivals of the received signal. A power delay profile may measure the intensity of the received signal as a ratio of power (e.g., decibels) and measure the time delay in units of time (e.g., seconds).

In examples described herein, "beam training frames" refer to data frames which are wirelessly transmitted from one node (e.g., neighbor device) to another node (e.g., network device 100) to determine settings (e.g., antenna settings) for generating a directional beam to establish a communication link between the nodes. Beam training frames may comprise any suitable format(s) that conforms with any suitable beamforming techniques or protocols (e.g., sector-level sweep, beam refinement protocol, etc.) for one or more mmWave Wi-Fi standards (e.g., 802.11ad, 802.11ay, etc.), now known and later developed. For instance, beam training frames may comprise 802.11ad or 802.11ay PHY packets (e.g., control type, single-carrier type, orthogonal frequency division multiplexing type, etc.) comprising beamforming training sequences.

In examples described herein, an "angle-of arrival" or "AoA" of a signal (e.g., mmWave propagation path) refers to an angular direction at which the signal is received at a node (e.g., network device 100). The AoA may be measured as an elevation angle and/or an azimuth angle with respect to an azimuth plane (i.e., horizontal plane).

In examples described herein, a "signal to interference and noise ratio" or "SINR" of a signal (e.g., mmWave propagation path) refers to a power (i.e., gain) of the signal divided by a sum of an interference power of one or more interfering signals and a power of background noise. A SINR may have units of ratio of power (e.g., decibels).

Referring now to the drawings, FIG. 1 is a block diagram of an example network device 100 for high spatial reuse for mmWave Wi-Fi. Network device 100 includes at least one processing resource 110 and at least one machine-readable storage medium 120 comprising (e.g., encoded with) at least path identification instructions 122, estimated AoA determination instructions 124, path selection instructions 126, and communication instructions 128 that are executable by the at least one processing resource 110 of network device 100 to implement functionalities described herein in relation to path identification instructions 122, estimated AoA determination instructions 124, path selection instructions 126, and communication instructions 128.

In the example of FIG. 1, network device 100 may engage in any network data transmission operations, including, but not limited to, switching, routing, bridging, or a combination thereof. In some examples, network device 100 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 100 may be any suitable type(s) of network devices made by any suitable manufacturer(s).

In the example of FIG. 1, network device 100 includes at least one radio (not shown) that operates in the mmWave band. In addition, the at least one radio of network device 100 may operate at one or more channels in the mmWave band. For instance, network device 100 may comprise at least one radio that operates at one or more channels in the 60 GHz band in accordance with at least one of the IEEE 802.11ad and 802.11 ay standards. It will be understood by one skilled in the art that the at least one radio of network device 100 may operate at any suitable channel(s) and any suitable frequency band(s) in the mmWave band and may conform to any suitable type(s) of wireless communication standards, now known and later developed. Moreover, it will be understood by one skilled in the art that network device 100 may comprise one, two, four, eight, or any suitable number of radios that operate in the mmWave band.

In the example of FIG. 1, the at least one radio of network device 100 may comprise an antenna which transmits and/or receives directional mmWave beams, omni-directional, pseudo-omnidirectional mmWave beams, or a combination thereof. In examples described herein, a "directional" beam refers to a signal which radiates more strongly in one or more directions as compared to one or more other directions along an azimuth plane (i.e., horizontal plane), whereas an "omnidirectional" beam refers to a signal which radiates equally in all directions along an azimuth plane. Moreover, in examples described herein, a "pseudo-omnidirectional" beam refers to a signal which radiates more strongly in one or more directions as compared to one or more other directions along an azimuth plane, but also radiates equally in one or more other directions along the azimuth plane. In some examples, the at least one radio of network device 100 may comprise a phased array antenna which can generate a directional beam and/or pseudo-omnidirectional beam. In examples described herein, a "phased array antenna" refers to an array of antenna elements that can create a directional signal which can be electronically steered to point in different directions. A phased array antenna may focus (e.g., radiate) radio frequency (RF) energy towards specific spatial directions (e.g., angular directions). In the example of FIG. 1, network device 100 may be configured to electronically steer the phased array antenna based on a beamforming codebook that stores the configurations of the antenna elements to steer the mmWave beam in each of a plurality of directions (e.g., angular directions). The beamforming codebook may be stored in the at least one machine-readable storage medium 120 or an external resource (e.g., server or cloud resource connected to the network) that communicates with network device 100 (e.g., via network path 140).

In the example of FIG. 1, network device 100 may be configured (e.g., encoded with instructions executable by at least one processing resource 110) to receive network request(s) 150 via a network path(s) 140 to communicate with one or more neighboring devices (e.g., a client device, another network device, etc.). Network path(s) 140 may include any suitable communication link(s) 142 (e.g., wired or wireless, direct or indirect, etc.) between network device 100 and a network. Network request(s) 150 may include any suitable instructions to instruct network device 100 to communicate with one or more neighboring devices (e.g., to perform at least path identification instructions 122, estimated AoA determination instructions 124, path selection instructions 126, and communication instructions 128).

In examples described herein, a "network path" may include a combination of hardware (e.g., communications interfaces, communication links, etc.) and instructions (e.g., executable by a processing resource) to communicate (e.g., receive, send) a command (e.g., network request 150) to an external resource (server, cloud resource, etc.) connected to the network.

In the example of FIG. 1, network device 100 may be configured (e.g., encoded with instructions executable by at least one processing resource 110) to send or receive communication signal(s) 170 via communication path(s) 160 to establish communication with the one or more neighboring devices. Communication path(s) 160 may include any suitable communication link(s) 162 (e.g., wired or wireless, direct or indirect) between network device 100 and one or more neighboring devices. For instance, network device 100 may transmit a mmWave beam to one or more neighboring devices or receive a mmWave beam from one or more neighboring device via the at least one radio that operates in the mmWave band to establish communication link(s) 162. Communication signal(s) 170 may include any suitable instructions to instruct network device 100 to communicate with one or more neighboring devices (e.g., to perform at least path identification instructions 122, estimated AoA determination instructions 124, path selection instructions 126, and communication instructions 128).

In examples described herein, a "communication path" may include a combination of hardware (e.g., communications interfaces, communication links, etc.) and instructions (e.g., executable by a processing resource) to communicate (e.g., receive, send) a command (e.g., communication signal 170) with a neighboring device.

In the example of FIG. 1, each neighboring device comprises a client device (i.e., station) in coverage range of network device 100. In examples described herein, "coverage range" refers to a maximum distance at which there is successful data transmission across a wireless link (e.g., mmWave propagation path), even if throughput of such data transmission is low. Each neighboring device comprises a processor, memory, and input/output interfaces for wired and/or wireless communications. Moreover, each neighboring device may engage in any network data transmission operations, including, but not limited to, switching, routing, bridging, or a combination thereof. In some examples, a neighboring device may comprise a WAP. In some examples, a neighboring device may comprise a laptop computer, a desktop computer, a mobile device, and/or other wireless devices, although examples of the disclosure are not limited to such devices. In examples described herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices.

In the example of FIG. 1, In the example of FIG. 1, each neighboring device includes at least one radio that operates in the mmWave band and can communicate with network device 100. In addition, the at least one radio of each neighboring device may operate at one or more channels in the mmWave band. It will be understood by one skilled in the art that the at least one radio of each neighboring device may operate at any suitable channel(s) and any suitable frequency band(s) in the mmWave band and may conform to any suitable type(s) of wireless communication standards, now known and later developed. Moreover, it will be understood by one skilled in the art that each neighboring device may comprise one, two, four, eight, or any suitable number of radios that operate in the mmWave band.

In the example of FIG. 1, path identification instructions 122, when executed by processing resource 110, may identify a plurality of mmWave propagation paths between network device 100 and a set of neighboring devices including a target neighboring device, based on PDPs of beam training frames received by network device 100 from each of the neighboring devices using a plurality of mmWave beams. Each of the mmWave propagation paths between network device 100 and a neighboring device can provide a communication link between network device 100 and one of the neighboring devices. In addition, each of the mmWave propagation paths between network device 100 and a neighboring device is established via one or more radios of each of network device 100 and the neighboring device that operate at one or more frequency channels in the mmWave band. Moreover, each of the mmWave beams used by network device 100 to receive the beam training frames may comprise one or more of the mmWave propagation paths. In some examples, the beam training frames received by network device from each of the neighboring devices may be transmitted by the neighboring devices using pseudo-omnidirectional mmWave beams.

In the example of FIG. 1, path identification instructions 122 may comprise instructions to generate each of the PDPs, wherein each of the PDPs maps a signal strength of the received beam training frames by network device 100 using one of the mmWave beams as a function of time delay. Moreover, each of the PDPs may be stored in at least one machine-readable storage medium 120 of network device 100 and/or an external resource (e.g., server or cloud resource connected to the network) that communicates with network device 100 (e.g., via network path(s) 140).

In the example of FIG. 1, path identification instructions 122 may comprise instruction to identify, for each of the PDPs, a number of impulses of the PDP at which the signal strength exceeds a predetermined threshold and a time delay associated with each impulse. The predetermined threshold used to determine the number of impulses of each PDP may be based on a transmit power (e.g., effective radiated power) of the beam training frames transmitted by the corresponding neighboring device and received by network device 100 to generate the PDP, a distance between network device 100 and the corresponding neighboring device, or a combination thereof. Moreover, the predetermined threshold used to determine the number of impulses of each PDP may account for a noise floor for signals received by network device 100, account for limitations of hardware (e.g., radios, antennas, etc.) of network device 100, or a combination thereof. The time delay associated with each of the impulses of each PDP may comprise an elapsed time from when the corresponding neighboring device transmits the beam training frames and to when network device 100 receives the beam training frames.

In the example of FIG. 1, path identification instructions 122 may comprise instructions to generate the aggregate path profile of the PDPs of the received beam training frames using the mmWave beams, wherein the aggregate path profile maps an aggregate signal strength of the received beam training frames of the PDPs as a function of time delay. Path identification instructions 122 to generate the aggregate path profile may comprise instructions to align the PDPs based on the time delays of the impulses of the PDPs and then to superimpose the aligned PDPs. It is noted that the PDPs of each of the mmWave beams used by network device 100 to receive the beam training frames will have a time delay associated with each impulse that is the same as a time delay associated with another impulse of another PDP that corresponds to the same mmWave propagation path. In other words, although the impulses associated with each of the PDPs may have a different gains as compared to the impulses associated with the other PDPs, each impulse of each of the PDPs will have an associated time delay that is the same as an associated time delay of an impulse of at least one other PDP, and this property can be exploited to identify impulses of different PDPs that correspond to the same mmWave propagation path. For example, path identification instructions 122 may comprise instructions to identify a line-of-sight (LOS) mmWave propagation path between network device 100 and a neighboring device, wherein the LOS mmWave propagation path corresponds to an impulse of one or more of the PDPs having the shortest time delay. Moreover, this identified LOS mmWave propagation path may be used as a reference to identify one or more other mmWave propagation paths, based on the time delay difference(s) between the impulse corresponding to the identified LOS mmWave propagation path and the other impulse(s) corresponding to the one or more other mmWave propogation paths. Moreover, the aggregate path profile of the PDPs may be stored in at least one machine-readable storage medium 120 of network device 100 and/or an external resource (e.g., server or cloud resource connected to the network) that communicates with network device 100 (e.g., via network path(s) 140).

In the example of FIG. 1, path identification instructions 122 may comprise instructions to identify a number of impulses of the aggregate path profile at which the aggregate signal strength exceeds a predetermined threshold. The predetermined threshold used to determine the number of impulses of the aggregate path profile may be based on a transmit power (e.g., effective radiated power) of the beam training frames transmitted by one or more neighboring devices and received by network device 100 to generate the PDPs, a distance between network device 100 and one or more of the neighboring devices, or a combination thereof. Moreover, the predetermined threshold used to determine the number of impulses of the aggregate path profile may account for a noise floor for signals received by network device 100, limitations of hardware (e.g., radios, antennas, etc.) of network device 100, or a combination thereof.

In the example of FIG. 1, path identification instructions 122 may comprise instructions to determine that the total number of mmWave propagation paths is equal to the number of impulses of the aggregate path profile. Moreover, path identification instructions 122 may comprise instructions to store the identified mmWave propagation paths (e.g., as identified paths 130) in at least one machine-readable storage medium 120 of network device 100 and/or an external resource (e.g., server or cloud resource connected to the network) that communicates with network device 100 (e.g., via network path(s) 140).

In the example of FIG. 1, estimated AoA determination instructions 124, when executed by processing resource 110, may generate a probability density function that indicates a probability of each of the identified mmWave propagation paths to be along each of a plurality of angles, based on the PDPs of the received beam training frames from the neighboring device. In addition, estimated AoA determination instructions 124 to generate the probability density function may comprise instructions to, for each of the identified mmWave propagation paths: for each of the mmWave beams of the identified mmWave propagation path: (1) determine, for each of the angles, a beam directivity gain of a predetermined radiation pattern of the received beam training frames along the angle, (2) determine a path strength gain of the identified mmWave propagation path using the mmWave beam, based on the PDPs of the received beam training frames from the neighboring device, and (3) compute, for each of the angles, a product of the beam directivity gain along the angle and the path strength gain of the identified mmWave propagation path using the mmWave beam. The plurality of angles may comprise any suitable a set of discretized elevation and/or azimuth angles (e.g., 0°, 1°, ... 359°) corresponding to possible angular directions of the identified mmWave propagation paths relative to a node (e.g., network device 100) along an azimuth plane (i.e., horizontal plane).

In the example of FIG. 1, estimated AoA determination instructions 124, when executed by processing resource 110, may determine, for each of the identified mmWave propagation paths, that the estimated AoA of the identified mmWave propagation path is one of the angles that has the highest probability among the angles to be along the mmWave propagation path as indicated by the probability density function. Alternatively, estimated AoA determination instructions 124 may comprise instructions to determine, for each of the identified mmWave propagation paths, that the estimated AoA of the mmWav propagation path is a range of angles (i.e., a plurality of the angles) that have the highest probability among the angles to be along the identified mmWave propagation path as indicated by the probability density function. Moreover, estimated AoA determination instructions 124 may comprise instructions to store the estimated AoAs of the identified mmWave propagation paths (e.g., as estimated AoAs 132) in at least one machine-readable storage medium 120 of network device 100 and/or an external resource (e.g., server or cloud resource connected to the network) that communicates with network device 100 (e.g., via network path(s) 140).

For instance, estimated AoA determination instructions 124 may comprise instructions to determine the estimated AoA of each of the identified mmWave propagation paths according to an angular profile estimation technique shown in Algorithm 1 below:

Algorithm 1:

Inputs:
$p_{tot}(t) = \{p_i(t_i)\}; i = 1, \ldots, n$     % dominant path set with n peaks at times $t_i$ $b^j = \{b_0^j, b_1^j, \ldots, b_{359}^j\}; j = 1, \ldots, N$     % discretized gain vector of $j^{th}$ beam in $\{B\}$ $P_{\vec{b}^j}(t) = \sum_{i=1}^{n} g_j^i \delta(t_i); j = 1, \ldots, N$     % PDP of each beam in $\{B\}$, where $g_j^i$ is strength of $i^{th}$ path for $j^{th}$ beam for i = 1:n do $\vec{f^i} = \{f_0^i, f_1^i, \ldots, f_{359}^i\} = \{0\}$     % AoA prob. vector for $i^{th}$ path, initialized to 0 for j = 1, ..., N do
  if $\delta(t_j) = 1$ then
    for k = 0, ..., 359 do $$f_k^i = f_k^i + g_j^i(p_i(t_i)) \cdot \frac{b_k^j}{\sum_{m=0}^{359} b_m^j}$$

end
  else
    %Skip this beam
  end
end

%Normalize to get AoA probability $$\vec{f^i} = \frac{\vec{f^i}}{\sum_{m=0}^{360} f_m^i}$$

$\theta_i = \arg\max_{k=0, \ldots 359} f_k^i$
end
$\Phi_s = \{(p_i(t_i), \theta_i); i = 1, \ldots, N\}$ Referring to Algorithm 1, $p_{tot}(t)$ refers to the aggregate path profile of the received beam training frames using the plurality of mmWave beams, wherein $\{p_i(t_i)\}$ is the aggregate path profile of all i=1, ..., n identified mmWave propagation paths at times $t_1, t_2, \ldots, t_n$. In addition, $\vec{b^j}$ refers to a beam directivity gain of the predetermined radiation pattern of the received beam training frames along the angles, wherein $b_k^j$ is a beam directivity gain of the predetermined radiation pattern using the $j^{th}$ mmWave beam in a set of mmWave beams {B} for all angles k=0°, 1°, ..., 359°. It is noted that the set of angles k=0°, 1°, ..., 359° is provided merely as an example, and that the set of angles k may comprise any suitable a set of discretized angles other than k=0°, 1°, ..., 359° that correspond to possible angular directions of the identified mmWave propagation paths relative to an azimuth plane (i.e., horizontal plane). Moreover, $$P_{\vec{B^j}}(t)$$

refers to the PDP for each beam in the set of mmWave beams {B}, wherein $\Sigma_{i=1}^n g_j^i \cdot \delta_{t_i}$ is the sum of the gains of impulses of the n identified mmWave propagation paths of the $j^{th}$ mmWave beam and where $\delta_{t_i}=1$ when the identified mmWave propagation path $p_i(t_i)$ appears in PDP, and is otherwise=0, and wherein $g_j^i$ is the gain associated with identified mmWave propagation path $p_i(t_i)$ for the $j^{th}$ mmWave beam.

As shown in Algorithm 1, the objective is determine the estimated AoA of each path in $p_{tot}(t)$ as a probability density function $f^i=\{f_0^i, f_1^i, \ldots, f_{359}^i\}$, i.e., the probability $f_k^i$ of identified mmWave propagation path $p_i(t_i)$ being along k, for all angles k=0°, 1°, ..., 359°. To this end, for each path $p_i$, for each receive beam $\vec{b^j}$ of path $p_i$, if the identified mmWave propagation path appears in the PDP of $\vec{b^j}$ (i.e., $\delta_{t_i}=1$ in $$P_{\vec{BJ}}(t)),$$

the contribution of $\vec{b^j}$ is added to $f^i$ by multiplying the normalized directivity gain $$\left(\frac{b_k^j}{\sum_{m=0}^{359} b_m^j}\right)$$

with PDP gain $g_j^i$ across all angles k=0°, 1°, ..., 359°. After iterating over all beams j=1, ..., N and adding the contribution of each beam with $i^{th}$ identified mmWave propagation path to $f^i$, the AoA likelihood vector $\vec{f^i}$ is determined and is normalized by the total probability mass to get AoA probability density of the $i^{th}$ identified mmWave propagation path along each angle k=0°, 1°, ..., 359°. The estimated AoA $\theta_i$ of $i^{th}$ identified mmWave propagation path is determined by finding the angle among the angles with the maximum probability $$\left(\theta_i = \arg\max_{k=0,1,\ldots,359°} f_k^i\right)$$

for the probability density function. By repeating this computation for all n dominant paths (i.e., all identified mmWave propagation paths between the receiver node (e.g., network device 100) and a neighboring node s (e.g., one of the neighboring devices in the set) in $p_{tot}(t)$, the angular profile $\Phi_s$ is determined for each neighboring node s, defined as the set of all (path, AoA) tuples. Finally, each neighboring node s is added to the set of nodes {S} for which the angular profiles $\Phi_s$ are known. It is noted that $\theta_i$ may also be defined as a range of the set of angles k with having a probability above a predetermined threshold. It may be determined whether $\theta_i$ corresponds to a single angle or a range of angles (i.e., a plurality of the angles k) depending on the number of angular directions for which interference is sought to be limited versus the number of mmWave beams that are available for data transmissions. Therefore, the angular profile estimation technique shown in Algorithm 1, when encoded as estimated AoA determination instructions 124 and executed by network device 100, may determine the estimated AoA of each identified mmWave propagation path $p_i(t_i)$ in $p_{tot}(t)$ as a probability density function $f^i=\{f_0^i, f_1^i, \ldots, f_{359}^i\}$.

In the example of FIG. 1, path selection instructions 126, when executed by processing resource 110, may select one of the mmWave beams that maximizes a SINR along the estimated AoA of each identified mmWave propagation path between network device 100 and the target neighboring device. For instance, the selected mmWave beam may maximize a SINR of the received beam training frames along the estimated AoA of each identified mmWave propagation path between network device 100 and the target neighboring device. In addition, path selection instructions 126 may comprise instructions to determine, for each of the mmWave beams, a ratio between: (1) a sum of beam directivity gains along the estimated AoA of each identified mmWave propagation path between network device 100 and the target neighboring device; and (2) a sum of beam directivity gains of the received beam training frames along the estimated AoA of each identified mmWave propagation path between network device 100 and every other neighboring device in the set. For instance, the determined ratio may be between: (1) a sum of beam directivity gains of the received beam training frames along the estimated AoA of each identified mmWave propagation path between network device 100 and the target neighboring device; and (2) a sum of beam directivity gains of the received beam training frames along the estimated AoAs of each identified mmWave propagation paths between network device 100 and every other neighboring device in the set. Moreover, path selection instructions 126 may comprise instructions to determine that the selected one of the mmWave beams has a highest value of the ratio among the ratios of the mmWave beams.

For instance, path selection instructions 126 may comprise instructions to select one of the identified mmWave propagation paths according to a beam selection technique shown in Algorithm 2 below:

$$\Gamma_j = \frac{\sum_{i=1}^n g_j^{\theta_i}}{\sum_{s=1}^{|S|} \sum_{l=1}^{n_s} g_j^{\theta_l}} \qquad \text{Algorithm 2}$$

Referring to Algorithm 2, $\Gamma_j$ refers to a ratio for the $j^{th}$ mmWave beam in the set of mmWave beams {B}, where the numerator is the sum of beam directivity gain $g_j^{\theta_i}$ along the estimated AoA $\theta_i$ for all i=1, ..., n identified mmWave propagation paths between the receiving node (i.e., network device 100) and the target neighboring node (e.g., the target neighboring device), and wherein the denominator is the sum of gains along directions of the identified mmWave propagation paths between the receiver node and the other neighboring nodes in the set {S} than the target neighboring node (i.e., interference paths between network device 100 and the other neighboring devices than the target neighboring device). Therefore, the beam selection technique shown in Algorithm 2, when encoded as path selection instructions 126 and executed by network device 100, may search over all mmWave beams in the set of mmWave beams {B} and select the one mmWave beam with maximum ratio $\Gamma$ $$\left(\text{i.e., } \tilde{b} = \arg\max_{j=1,\ldots,N} \Gamma_j\right).$$

In the example of FIG. 1, communication instructions 128, when executed by processing resource 110, may communicate with the target neighboring device using the selected mmWave beam. For instance, communication instructions 128 may comprise instructions to receive, from the target neighboring device, a mmWave signal along the estimated AoA (a single angle or a range of angles) corresponding to the selected mmWave beam. In addition, communication instructions 128 may comprise instructions to transmit, to the target neighboring device, a mmWave signal along the estimated AoA (a single angle or a range of angles) corresponding to the selected mmWave beam.

In this manner, the example network device 100 of FIG. 1 may provide high spatial reuse for mmWave Wi-Fi. For instance, network device 100 may identify a plurality of identified mmWave propagation paths between network device 100 and a set of neighboring devices including a target neighboring device, and determine, for each of the neighboring devices in the set, an estimated AoA of each identified mmWave propagation path between network device 100 and the neighboring device, thereby identifying possible communication paths between network device 100 and the target neighboring device, possible interference paths between network device 100 and other neighboring devices in the set, and the spatial directions (e.g., angular directions) of such paths. In addition, network device 100 may select one of the mmWave beams that maximizes a SINR along the estimated AoA of each identified mmWave propagation path between network device 100 and the target neighboring device, and communicate with the target neighboring device using the selected mmWave beam, thereby providing mmWave communications between network device 100 and the target neighboring device using a mmWave beam that mitigates inter-link interference along interference paths between network device 100 and the other neighboring devices in the set that operate in the same frequency channel and spatial resources.

In contrast, existing techniques for mmWave Wi-Fi are modeled based on horn antennas with ideal, highly directional mmWave beam patterns, and do not account for the side lobes that exist for directional mmWave beams (e.g., mmWave beams generated by phased antenna arrays). Accordingly, existing mmWave Wi-Fi techniques can transmit signals in unintended directions, even when a main lobe of a mmWave beam is pointed towards the intended receiver, and thereby can result in inter-link interference between multiple, concurrent mmWave communications that operate in the same frequency channel and spatial resources. Thus, existing mmWave Wi-Fi techniques may experience collisions and significant data rate loss (and throughput loss), diminished spatial reuse gains, and/or decreased overall network throughput for mmWave Wi-Fi.

In the example of FIG. 1, when a neighboring device is a network device (e.g., WAP) that can periodically send beam training frames as part of a standard beaconing procedure according to a mmWave Wi-Fi standard (e.g., 802.11ad, 802.11 ay), path identification instructions 122, when executed by processing resource 110, may generate the PDPs of received beacon frames from the neighboring device using the mmWave beams. In such example, network device 100 will receive the beacon frames from the neighboring device over multiple beacon intervals (i.e., beaconing epochs), such that network device 100 receives the beacon frames sent by a fixed mmWave beam of the neighboring device during each beacon interval. The beacon frames comprise training fields which can be used to estimate link strength and can thereby be repurposed as the beam training frames. Thus, path identification instructions 122 may use the standard mandated training frame exchanges (e.g., beacon sweeps) according to existing mmWave Wi-Fi standards (e.g., 802.11d, 802.11 ay) to generate the PDPs of received beacon frames from the neighboring network device.

In such example, to ensure transmission of the beacon frames in all directions, the neighboring device transmits the beacon frames sequentially across all its mmWave beams (thereby as a beacon sweep) during a beacon interval. Unlike the angular profile estimation algorithm shown in Algorithm 1, which requires use of a receive beam sweep, beacon sweeps are typically performed as transmit beam sweeps according to existing mmWave Wi-Fi standards (e.g., 802.11ad, 802.11ay). Thus, when a neighboring device is a network device that can periodically transmit beam training frames as part of a standard beaconing procedure (i.e., as transmit beacon sweeps), path identification instructions 122 may comprise instructions to receive a beam sweep by switching between multiple mmWave beams over successive beacon sweeps and gradually building the angular profile.

For instance, path identification instructions 122 may comprise instructions to generate the PDPs of received beacon frames from the neighboring devices, according to the PDP estimation technique shown in Algorithm 3 below:

---

Algorithm 3:

---

```
Inputs:
    {S}                          % Set of all nodes s with known Φ_s
Event: Start Rx new frame
if (frame=beacon && s ∉ {S}) then
    % first beacon sweep from node s
    M = 1, p = 0, r = 0      % Initialize parameters
    for m=1, . . . , N do
        Rx beacon m
        Calculate PDP p^m(t) and find p_tot^m(t) = {p_i^m(t_i)}
        if (|P^m(t)| > p ||(|P^m(t)| = p && R^m > r)) then
            M=m
            p=|P^m(t)|
            r=R^m
        end
    end
end
% Starting receive sweep
j=1                              % Iterator for receive beam
while (j < N) do
    Event: Next beacon sweep from s
    Wait till beacon M_j
    Calculate PDP P_b,j^M(t) using beam j
    j++
end
Output {P_{b,j}(t)}              % PDP of each beam in {B}
```

Referring to Algorithm 3, when the receiving node (e.g., network device 100) receives a new frame ("Event: Start Rx new frame") and detects a beacon sweep from a neighboring nodes (e.g., the neighboring network device) for which there is no existing aggregate path profile, the received beacon frames are analyzed to find a beacon transmit beam M (e.g., a mmWave beam used by the neighboring network device as part of its transmit beacon sweep) which captures all dominant paths (e.g., mmWave propagation paths between network device 100 and the neighboring network device) in the channel. The objective is to emulate a receive beam sweep by switching between all available mmWave beams by the receiving node in subsequent beacon sweeps when the neighboring node transmits its beacon via the $M^{th}$ beacon transmit beam during its beacon sweep. The first beacon sweep is received at the receiving node using a pseudo-omnidirectional mmWave beam, and for each successive beacon transmission m (the neighboring node will send N beacons using all its beacon transmit beams), the PDP $P^m(t)$ is calculated. If this new beacon transmission m captures a greater number of identified mmWave propagation paths $|p_{tot}^m(t)|$ than any previous beacon transmission, the beam index M is updated as the current beam used for this new beacon transmission m. Note that if two or more beacon transmissions capture the same maximum number of mmWave propagation paths, the beacon transmission with a greatest received signal strength (RSS) $R^m$ is selected. After the beacon transmit beam that captures the greatest number of identified mmWave propagation paths is identified, in subsequent beacon sweeps, the receiving node switches between its mmWave receive beams for the identified beacon transmit beam to emulate a receive beam sweep and collects PDPs $P_{b_j}^M(t)$ for all mmWave receive beams j=1, . . . , N. After estimating the PDP for all mmWave receive beams, the angular profile estimation technique shown in Algorithm 1 may be used to estimate the angular profile $\Phi_s$ for this neighboring node s. Therefore, the PDP estimation technique shown in Algorithm 3, when encoded as path identification instructions 122 and executed by network device 100, may generate the PDPs of received beacon frames from the neighboring device.

In this manner, the example network device 100 of FIG. 1 may identify a plurality of mmWave propagation paths between the network device and a neighboring network device by using standard-mandated periodic beam sweeps according to existing mmWave Wi-Fi standards (e.g., 802.11ad, 802.11 ay).

In the example of FIG. 1, when a neighboring device is a non-associated station (i.e., a client device that is not associated with any network device), network device 100 will wait for the target neighboring device to enter into a beam training session with another network device (e.g., WAP) that it is to associate with before executing path identification instructions 122. Such beam training sessions are frequently repeated as part of existing mmWave Wi-Fi standards (e.g., 802.11ad, 802.11 ay) to establish communication links between WAPs and non-associated client devices. When the neighboring device enters into the beam training session with the other network device that it is to associate with, network device 100 may generate the aggregate path profile (e.g., according to path identification instructions 122) by receiving the beam training frames using the plurality of mmWave beams. Conversely, when the target neighboring device is a station (i.e., client device) that is already associated with another network device (e.g., WAP), network device 100 may execute path identification instructions 122 to build the angular profile when the target neighboring device performs beam training with its associated network device for link maintenance. In such example, network device 100 may receive the beam training frames using the plurality of mmWave beams over several beam training sessions.

In this manner, the example network device 100 of FIG. 1 may identify a plurality of mmWave propagation paths between the network device and a non-associated station that is to be associated with another network device, and may also identify a plurality of mmWave propagation paths between the network device and a station that is already associated with another network device.

In some examples, a network may comprise multiple network devices 100 which each communicate with respective target neighboring device(s). In such examples, each network device 100 in the network may communicate with each of its respective target neighboring device(s) by performing at least path identification instructions 122, estimated AoA determination instructions 124, path selection instructions 126, and communication instructions 128. Thus, each of the network devices 100 in the network will select mmWave beam(s) that maximizes a SINR between the network device 100 and target neighboring device(s).

In this manner, examples described herein promote spatial reuse between multiple network devices 100 concurrently communicating with respective target devices.

Figure 2:
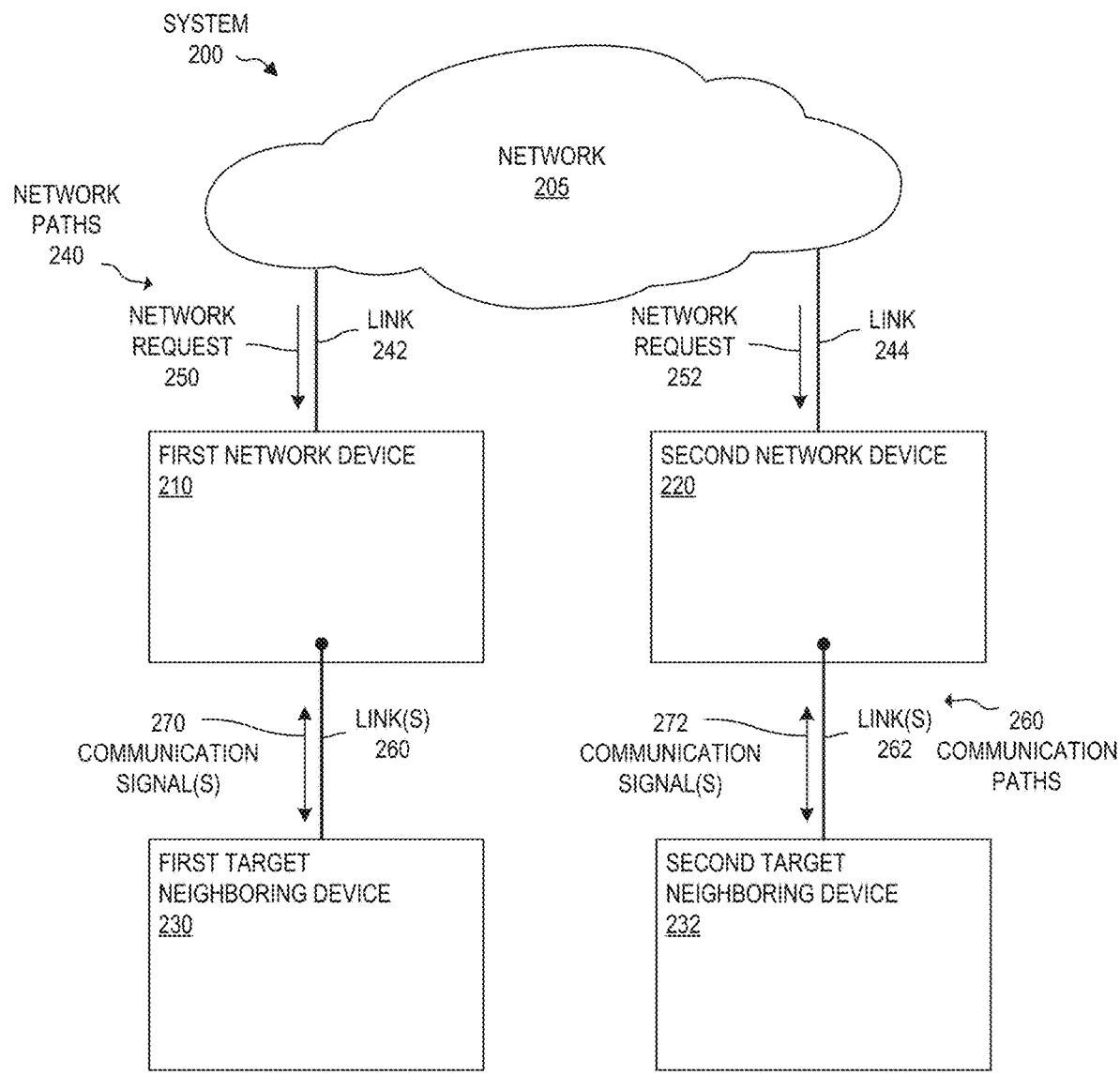
FIG. 2 shows a block diagram for an example system for high spatial reuse for mmWave Wi-Fi.

FIG. 2 is a block diagram of an example system 200 for high spatial reuse for mmWave Wi-Fi. System 200 includes a network 205, a first network device 210, a second network device 220, first target neighboring device 230, and second target neighboring device 232. Each of first network device 210 and second network device 220 may comprise a network device (i.e., network device 100) as described above in relation to FIG. 1.

In the example of FIG. 2, first network device 210 and second network device 220 are each connected to at least one network 205. Moreover, first network device 210 and second network device 220 may communicate with each other via network 205. Network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, in some examples, network 205 may comprise one or more cellular networks using one or more mobile communications standards (e.g., 4G, 5G, etc.). It will be understood by one skilled in the art that system 200 may comprise any suitable type(s) of network(s) 205. Moreover, although FIG. 2 shows that two network devices (i.e., first network device 210 and second network device 220) are connected to network 205, it will be understood that any suitable number(s) of network devices may be connected to network 205.

In the example of FIG. 2, network 205 may comprise a controller that is connected to each of first network device 210 and second network device 220. In such example, the controller may be configured (e.g., encoded with instructions executable by at least one processing resource) to manage first network device 210 and second network device 220 (e.g., send network requests 250 and 250 to first and second network devices 210 and 220), and may also be configured to manage other network devices (switches, WAPs, routers, etc.) connected to network 205. Moreover, the controller may gather network operating information from various nodes of network 205, including network traffic load information, network topology information, network usage information, etc. Furthermore, the controller may transmit commands to various nodes of network 205 to alter network topology and routing to achieve various network efficiency and efficacy goals. It will be understood by one of ordinary skill in the art that a controller may comprise any suitable type(s) of computing device(s) for managing various network devices, including first network device 210 and second network device 220. Moreover, a controller may include any necessary hardware components to perform the inventions disclosed herein, including, but not limited to: processors, memories, display devices, input devices, communications equipment, etc. In another example, first network device 210, second network device 220, and/or other network devices in network 205 may managed in a distributed manner without requiring a separate controller. For instance, one of first network device 210 and second network device 220 may operate as a virtual controller for managing one or more other network devices in network 205.

In the example of FIG. 2, first network device 210 may be configured (e.g., encoded with instructions executable by at least one processing resource) to receive network request 250 via one or more network paths 240 to communicate with one or more neighboring devices (e.g., a client device, another network device, etc.). Similarly, second network device 220 may be configured (e.g., encoded with instructions executable by at least one processing resource) to receive network request 252 via one or more network paths 240 to communicate with one or more neighboring devices (e.g., a client device, another network device, etc.) Network paths 240 may include any suitable communication link(s) 240 (e.g., wired or wireless, direct or indirect, etc.) between first network device 210 and network 205, and may include any suitable communication link(s) 242 (e.g., wired or wireless, direct or indirect, etc.) between second network device 220 and network 205. Network request(s) 250 may include any suitable instructions to instruct first network device 210 to communicate with one or more neighboring devices of first network device 210 (e.g., to perform at least path identification instructions 122, estimated AoA determination instructions 124, path selection instructions 126, and communication instructions 128). Similarly, network request(s) 252 may include any suitable instructions to instruct second network device 220 to communicate with one or more neighboring devices of second network device 220 (e.g., to perform at least path identification instructions 122, estimated AoA determination instructions 124, path selection instructions 126, and communication instructions 128).

In the example of FIG. 2, first network device 210 may be configured (e.g., encoded with instructions executable by at least one processing resource) to send or receive communication signal(s) 270 via communication path(s) 260 to establish communication with the one or more neighboring devices. Similarly, second network device 220 may be configured (e.g., encoded with instructions executable by at least one processing resource) to send or receive communication signal(s) 262 via communication path(s) 262 to establish communication with one or more neighboring devices. Communication paths may include any suitable communication link(s) 260 (e.g., wired or wireless, direct or indirect) between first network device 210 and respective one or more neighboring network devices, and may include any suitable communication link(s) 262 (e.g., wired or wireless, direct or indirect) between second network device 220 and respective one or more neighboring devices. For instance, first network device 210 may transmit receive a mmWave beam to one or more respective neighboring devices or receive a mmWave beam from one or more respective neighboring device via at least one radio that operates in the mmWave band to establish communication link(s) 260. Similarly, second network device 220 may transmit receive a mmWave beam to one or more respective neighboring devices or receive a mmWave beam from one or more respective neighboring device via at least one radio that operates in the mmWave band to establish communication link(s) 262.

In the example of FIG. 2, each of first network device 210 and second network device 220 may be within coverage range of each other (i.e., first network device 210 is a neighboring device of second network device 220, and second network device 220 is a neighboring device of first network device 210). In addition, system 200 may comprise a plurality of neighboring devices (including target neighboring device 230) of first network device 210 that are in coverage range of first network device 210. Similarly, system 200 may comprise a plurality of neighboring devices (including target neighboring device 232) of second network device 220 that are in coverage range of second network device 220.

In the example of FIG. 2, system 200 may comprise a cluster of network devices including first network device 210 and second network device 220. Each of the network devices in the cluster may be in coverage range of each other. One of the network devices in the cluster (e.g., first network device 210 or second network device 220) may be designated as the leader device of the cluster, wherein the leader device may configure other network devices in the cluster, add network devices to the cluster, remove network devices from the cluster, or a combination thereof.

In the example of FIG. 2, each of first and second target neighboring devices 230 and 232 comprises a client device (i.e., station) in coverage range of network device 100. In addition, each of first and second target neighboring device 230 and 232 comprises a processor, memory, and input/output interfaces for wired and/or wireless communications. Moreover, each of first and second neighboring device 230 and 232 neighbor device may engage in any network data transmission operations, including, but not limited to, switching, routing, bridging, or a combination thereof. In some examples, one or both of first and second target neighboring device 230 and 232 may comprise a WAP. In some examples, one or both of first and second target neighboring device 230 and 232 may comprise a laptop computer, a desktop computer, a mobile device, and/or other wireless devices, although examples of the disclosure are not limited to such devices.

In the example of FIG. 2, each of first and second target neighboring devices 230 and 232 includes at least one radio that operates in the mmWave band and can communicate with first network device 210 and second network device 220, respectively. In addition, the at least one radio of each of first and second target neighboring devices 230 and 232 may operate at one or more channels in the mmWave band.

In the example of FIG. 2, first and second network devices 210 and 220 in the cluster may communicate with the first and second neighboring devices 230 and 232 using timeshare transmissions as follows. First, each of the network devices in the cluster (including first and second network devices 210 and 220) may be configured to divide a beacon interval (i.e., the time between successive beacon sweeps) into multiple sub-intervals. Each beacon interval may start with a beacon sweep (i.e., beacon transmission interval), followed by an optional associated beamforming training (A-BFT) period where respective neighboring devices may do beam sweeps in response to a network device's beam sweep, and followed by a data transmission interval where communication between the network device and associated neighboring devices may take place. During each beacon transmission and/or the A-BFT period, each network device in the cluster may be configured to use the mmWave channel during a different sub-interval (i.e., in a time-share manner) and/or to transmit beacon and/or beam training frames during a different sub-interval. During each data transmission interval, each of the network devices in the cluster may be configured take turns to communicate with its respective target neighboring devices during a different sub-interval. For instance, during a first sub-interval of a data transmission interval, first network device 210 may be configured to communicate with first target neighboring device 230, and during a second sub-interval of the data transmission interval, second network device 220 may be configured to communicate with second target neighboring device 230. Under this time-share transmission scheme, each network device in the cluster may be configured to select mmWave beams to maximize signal strength rather than SINR, since the network device would not experience inter-link interference in the same mmWave channel from other network devices in the cluster. For instance, during time-share transmissions, each network device in the cluster may be configured to select mmWave beams to maximize the signal-to-noise ratio (SNR) of the mmWave beam (e.g., by executing at least path identification instructions 122, estimated AoA determination instructions 124, and path selection instructions 126).

In examples described herein, a "signal to noise ratio" or "SNR" of a signal (e.g., mmWave propagation path) refers to a power (i.e., gain) of the signal divided by a power of background noise. A SNR may have units of ratio of power (e.g., decibels).

In the example of FIG. 2, first and second network devices 210 and 220 in the cluster may communicate with the first and second neighboring devices 230 and 232 using concurrent transmissions as follows. First, each of the network devices in the cluster (including first and second network devices 210 and 220) may be configured to generate angular profiles of communication and interference paths with its respective target neighboring device by executing path identifications 122, estimated AoA determination instructions 124, and path selection instructions 126, e.g., in accordance with angular profile estimation technique shown in Algorithm 1 above, in accordance with beam selection technique according to Algorithm 2 above, and/or in accordance with PDP estimation technique according to Algorithm 3 above. During this initial learning phase (hereinafter, "STP"), each of the nodes (e.g., network devices, neighboring devices) adopt the standard policy of selecting beams (b) during beam sweeps of beam training frames to maximize the signal strength R (i.e., $$\tilde{b} = \arg \max_{j=1,\ldots,N} R^j).$$

Moreover, the leader device (e.g., first network device 210 or second network device 220) in the cluster of network devices may determine an average network throughput metric $\eta_{STP}$ of each network device in the cluster during the STP, wherein $\eta_{STP}$ refers to the sum of all successfully transmitted and received packets over the past X beacon intervals, wherein X refers to a protocol parameter and can be adjusted in the run-time to ensure low variance. For instance, each of the network devices in the cluster may monitor $\eta_{STP}$ of the network device, and then transmit a value of $\eta_{STP}$ of the network device to the leader device. Based on (e.g., in response to) the transmitted value of $\eta_{STP}$ of each of the network devices in the cluster, the leader device may determine $\eta_{STP}$ of each of the network devices in the cluster.

Next, after the STP, where nodes build angular profiles for communication paths and each of network devices in the cluster builds such profile for at least one interference path, the leader device may be configured to initiate a spatial reuse phase (hereinafter "SRP"), in which the network devices in the cluster are configured to communicate with their respective neighboring devices (i.e., stations) using concurrent transmissions during data intervals of the beacon interval. The leader device may be configured to announce (e.g., transmit a signal to indicate) the start of the SRP to its neighboring devices and to the other network devices in the cluster by setting the spatial reuse bit to 1 in its beacon transmission, as specified in IEEE 802.11 standards. During SRP, each node (network device or station) may select mmWave beams to maximize SINR to limit energy transmission along possible interference path directions (e.g., mmWave propagation paths between each network device and its respective neighboring devices other than a target neighboring device) instead of maximizing signal strength (e.g., SNR) alone, by executing at least path identification instructions 122, estimated AoA determination instructions 124, and path selection instructions 126 as described above. As a result, each of the nodes switch to SINR maximizing beams with an objective to maximize spatial reuse. After start of the SRP is announced, all network devices and stations change the beam selection criteria to SINR maximization without requiring any feedback to the knowledge about beam selection at other nodes. Moreover, the leader device (e.g., first network device 210 or second network device 220) in the cluster of network devices may determine an average network throughput metric $\eta_{SRP}$ of each network device in the cluster during the SRP, wherein $\eta_{SRP}$ refers to the sum of all successfully transmitted and received packets over the past X beacon intervals, wherein X refers to a protocol parameter and can be adjusted in the run-time to ensure low variance. For instance, each of the network devices in the cluster may monitor $\eta_{SRP}$ of the network device, and then transmit a value of $\eta_{SRP}$ of the network device to the leader device. Based on (e.g., in response to) the transmitted value of $\eta_{SRP}$ of each of the network devices in the cluster, the leader device may determine $\eta_{SRP}$ of each of the network devices in the cluster. Based on (e.g., in response to) a determination that $\eta_{SRP} \geq \eta_{STP}$ for a network device in the cluster, the leader device may be configured to determine that the SRP is successful in improving net throughput and spatial reuse for the network device. On the other hand, based on (e.g., in response to) a determination that the average network throughput $\eta_{SRP}$ of a network device in the cluster worsens during the SRP (i.e., $\eta_{SRP} < \eta_{STP}$ for the network device), the leader device may be configured to ungroup the network device from the cluster. In such example, one or more network devices (e.g., the leader device, the ungrouped network device, other remaining network devices in the cluster) may be configured switch back to signal strength (e.g., SNR) maximizing policy for beam selection.

For instance, in the example system 200 of FIG. 2, first network device 210 may be designated as a leader device for a cluster of network devices in system 200. First network device 210 may be designated as the leader device by a controller, or in a distributed manner (without a controller) in accordance with a mmWave standard (e.g., 802.11ad, 802.11ay). First network device 210 (i.e., the designated leader device) may group a network device into the cluster, based on a determination that the network device or one or more of its respective neighboring devices is in coverage range of first network device 210. For instance, first network device 210 may group second network device 220 into the cluster, based on a determination that second network device 220 or one or more of its respective neighboring devices (e.g., second target neighboring device 232) is in the set of neighboring devices of first network device 210.

In the example of FIG. 2, each of the network devices in the cluster (including first network device 210 and second network device 220) may be configured to monitor the average network throughput $\eta_{STP}$ of the network device during the STP. Each of the network devices in the cluster may send the average network throughput $\eta_{STP}$ value for the STP to the first network device 210. Then, first network device 210 may be configured to announce the start of the SRP to its respective neighboring devices (including target neighboring device 230) and to other network devices in the cluster (including second network device 220). After start of the SRP is announced, first and second network devices 210 and 220 and their respective neighboring devices change the beam selection criteria to SINR maximization without requiring any feedback to the knowledge about beam selection at other nodes. During the SRP, each of first and second network devices 210 and 220 may select mmWave beams to maximize SINR to limit energy transmission along interference path directions, by executing at least path identification instructions 122, estimated AoA determination instructions 124, and path selection instructions 126 as described above. During the SRP, first network device 210 may configure each of the network devices in the cluster to communicate concurrently using the same mmWave channel. For instance, first network device 210 may communicate with first target neighboring device 230 (e.g., by executing at least communication instructions 128) using the first mmWave beam at a same time (i.e., concurrently) as when second network device 220 communicates with second target neighboring device 232 (e.g., by executing at least communication instructions 128) using the second mmWave beam.

In the example of FIG. 2, each of the network devices in the cluster (including first and second network devices 210 and 220) may be configured to monitor the average network throughput $\eta_{SRP}$ of the network device during the SRP. Each of the network devices in the cluster may send the average network throughput $\eta_{SRP}$ value during the SRP to the first network device 210 (i.e., the leader device). First network device 210 may be configured to determine, for each of the network devices in the cluster, the first average throughput $\eta_{SRP}$ of the network device during concurrent communications of the network devices in the cluster using the same mmWave channel, and determine, for each of the network devices in the cluster, the second average throughput $\eta_{STP}$ of the network device during time-sharing communications of the network devices in the cluster using the same mmWave channel. For each of the network devices in the cluster, based on (e.g., in response to) a determination that $\eta_{SRP} \geq \eta_{STP}$ for the network device, first network device 210 may determine that SRP is successful in improving net throughput and spatial reuse. In addition, for each of the network devices in the cluster, based on (e.g., in response to) a determination that $\eta_{SRP} < \eta_{STP}$ for the network device, first network device 210 may ungroup the network device from the cluster. In such example, one or both of first network device 210 and second network device 220 may be configured switch back to signal strength (e.g., SNR) maximizing policy for beam selection.

In this manner, the example system 200 of FIG. 2 may provide high spatial reuse for mmWave Wi-Fi. For instance, each of first and second network devices 210 and 230 may identify a plurality of identified mmWave propagation paths between the network device and a set of respective neighboring devices including a target neighboring device, and determine, for each of the respective neighboring devices in the set, an estimated AoA of each identified mmWave propagation path between the network device and the respective neighboring device, thereby identifying possible communication paths between each of first and second network devices 210 and 220 and its respective target neighboring device, possible interference paths between each of first and second network devices 210 and 220 and its other neighboring devices in the respective set, and the spatial directions (e.g., angular directions) of such paths. In addition, each of the first and second network devices 210 and 220 may select one of the mmWave beams that maximizes a SINR along the estimated AoA of each identified mmWave propagation path between the network device and the respective target neighboring device, and communicate with the target neighboring device using the selected mmWave beam, thereby providing mmWave communications between each of the first and second network devices 210 and 220 and its respective target neighboring device using a mmWave beam that mitigates inter-link interference along interference paths between the network device and other network devices in the cluster that operate in the same frequency channel and spatial resources.

Moreover, in example system 200 of FIG. 2, first network device 210 may be designated as a leader device of a cluster of network devices including first network device 210 and second network device 220, and to determine, for each of the network devices in the cluster, a first average throughput $\eta_{STP}$ of the network device during time-share transmissions of the network devices in the cluster using the same mmWave channel and a second average throughput $\eta_{SRP}$ of the network device during concurrent transmissions of the network devices in the cluster using the same mmWave channel, and based on a determination that $\eta_{SRP} < \eta_{STP}$ for second network device 220, ungroup second network device 220 from the cluster, thereby ensuring that concurrent transmissions in the same mmWave channel by first network device 210 and second network device 220 only occur when such transmissions yield improved net throughput and spatial reuse.

Figure 3:
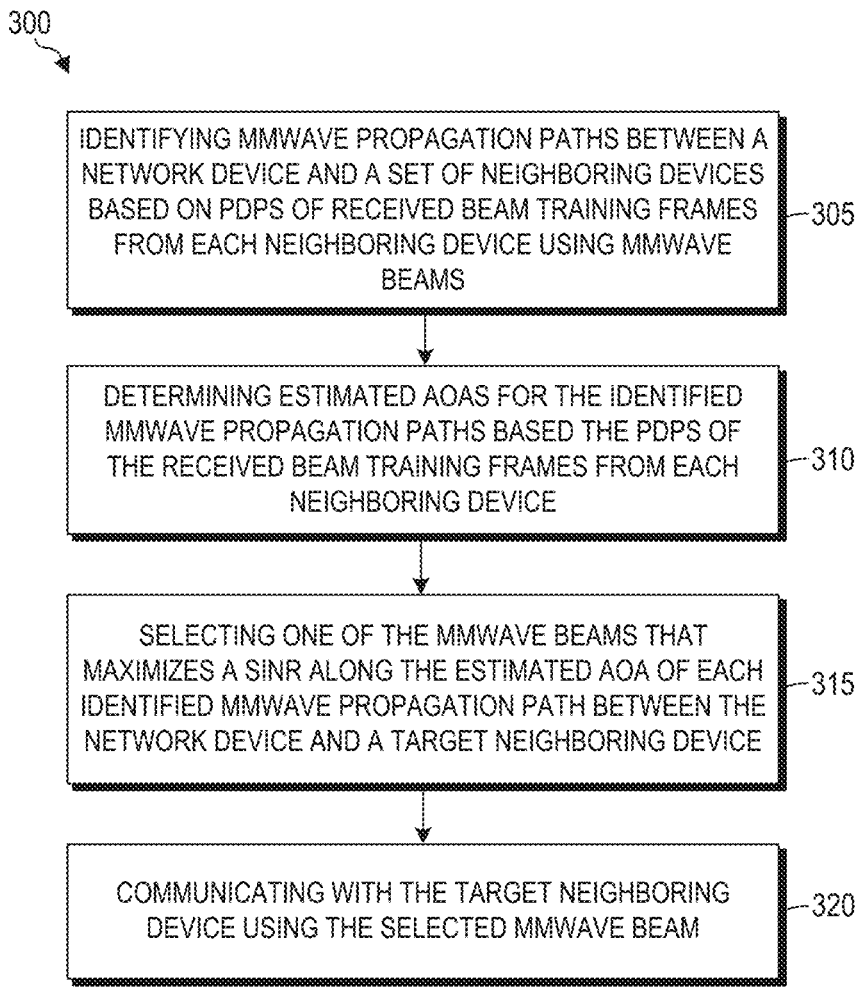
FIG. 3 is a flowchart of an example method for high spatial reuse for mmWave Wi-Fi.

FIG. 3 is a flowchart of an example method 300 for high spatial reuse for mmWave Wi-Fi. Although execution of method 300 is described below with reference to network device 100, other network devices suitable for the execution of method 300 may be utilized. Additionally, implementation of method 300 is not limited to such examples. While only five blocks are shown in method 300, method 300 may include other actions described herein. Additionally, although the blocks are shown in an order, blocks depicted in FIG. 3 may be performed in any order and at any time. Also, some of the blocks shown in method 300 may be omitted without departing from the spirit and scope of this disclosure.

Referring to FIG. 3, at block 305 of method 300, path identification instructions 122, when executed by processing resource 110, may identify a plurality of mmWave propagation paths between network device 100 and a set of neighboring devices including a target neighboring device, based on PDPs of beam training frames received by the network device from each of the neighboring devices using a plurality of mmWave beams. Each identified mmWave propagation path between network device 100 and a neighboring device can provide a wireless communication link between network device 100 and the neighboring device.

At block 310 of method 300, estimated AoA determination instructions 124, when executed by processing resource 110, may determine, for each of neighboring devices in the set, an estimated AoA of each identified mmWave propagation path between network device 100 and the neighboring device, based on the PDPs of the received beam training frames from the neighboring device.

At block 315 of method 300, path selection instructions 126, when executed by processing resource 110, may select one of the mmWave beams that maximizes a SINR along the estimated AoA of each identified mmWave propagation path between network device 100 and the target neighboring device. For instance, the selected mmWave beam may maximize a SINR of the received beam training frames along the estimated AoA of each identified mmWave propagation path between network device 100 and the target neighboring device. In some examples, the selected mmWave beam minimizes interference from the other neighboring network devices in the set than the target neighboring device along the estimated AoA of each identified mmWave propagation path between network device 100 and the other neighboring devices in the set than the target neighboring device.

At block 320 of method 300, communication instructions 128, when executed by processing resource 110, may communicate with the target neighboring device using the selected mmWave beam. Communication instructions 128 may comprise instructions to receive, from the target neighboring device, a mmWave signal along the estimated AoA corresponding to the selected mmWave beam. Moreover, communication instructions may comprise instructions to transmit, to the target neighboring device, a mmWave signal along the estimated AoA corresponding to the selected mmWave beam.

Figure 4:
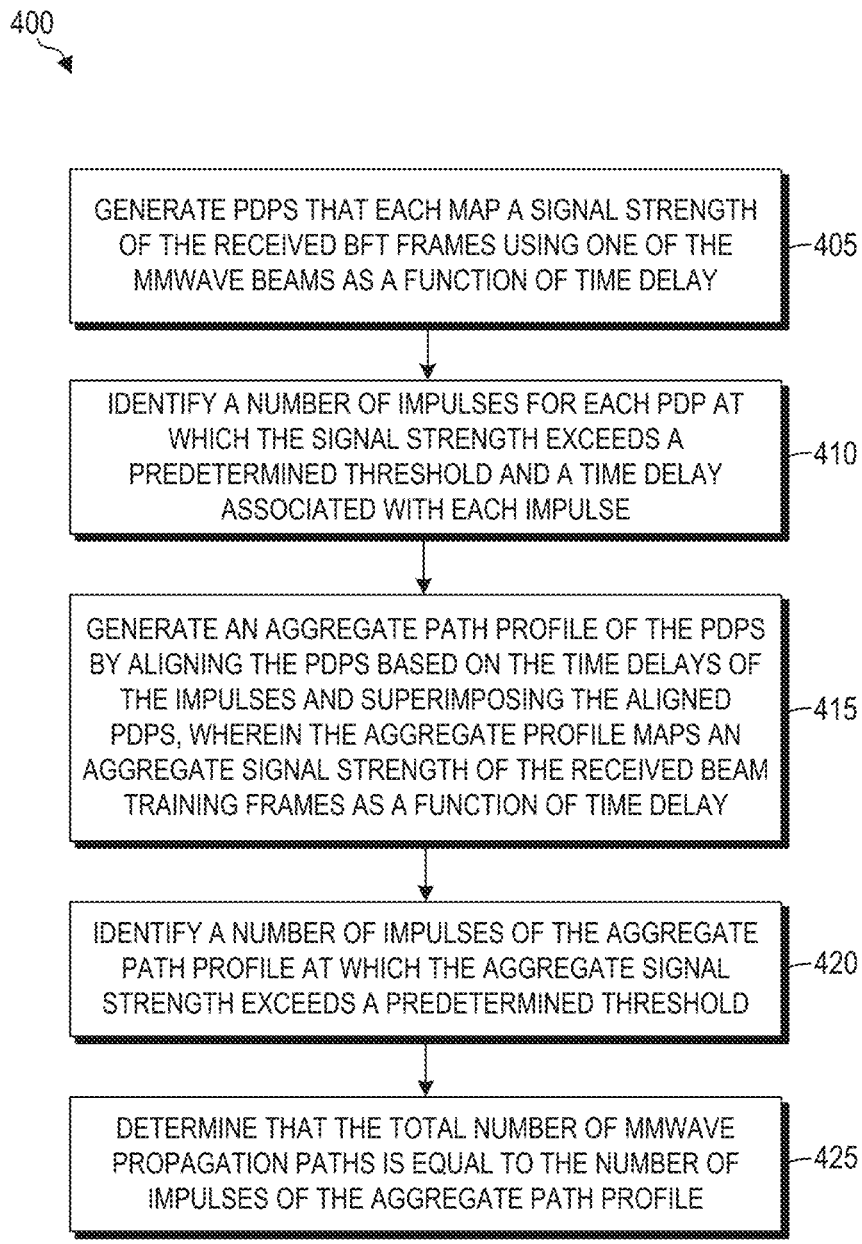
FIG. 4 is a flowchart of an example method for high spatial reuse for mmWave Wi-Fi.

FIG. 4 is a flowchart of an example method 400 for high spatial reuse for mmWave Wi-Fi. Although execution of method 400 is described below with reference to network device 100, other network devices suitable for the execution of method 400 may be utilized. Additionally, implementation of method 400 is not limited to such examples. While only five blocks are shown in method 400, method 400 may include other actions described herein. Additionally, although the blocks are shown in an order, blocks depicted in FIG. 4 may be performed in any order and at any time. Also, some of the blocks shown in method 400 may be omitted without departing from the spirit and scope of this disclosure.

Referring to FIG. 4, at block 405 of method 400, path identification instructions 122, when executed, may generate each of the PDPs, wherein each of the PDPs maps a signal strength of the received beam training frames by network device 100 using one of the mmWave beams as a function of time delay.

At block 410 of method 400, path identification instructions 122, when executed, may identify, for each of the PDPs, a number of impulses of the PDP at which the signal strength exceeds a predetermined threshold (i.e., a "first predetermined threshold") and a time delay associated with each impulse of the PDPs.

At block 415 of method 400, path identification instructions 122, when executed, may generate the aggregate path profile of the PDPs of the received beam training frames using the mmWave beams, wherein the aggregate path profile maps an aggregate signal strength of the received beam training frames of the PDPs as a function of time delay. Moreover, at block 415 of method 400, path identification instructions 122, when executed, may generate the aggregate profile of the PDPs by aligning the PDPs based on the time delays of the impulses of the PDPs and superimposing the aligned PDPs.

At block 420 of method 400, path identification instructions 122, when executed, may identify a number of impulses of the aggregate path profile at which the aggregate signal strength exceeds a predetermined threshold (i.e., a "second predetermined threshold) of the aggregate path profile.

At block 425 of method 400, path identification instructions 122, when executed, may determine the total number of mmWave propagation paths is equal to the number of impulses of the aggregate path profile.

Figure 5:
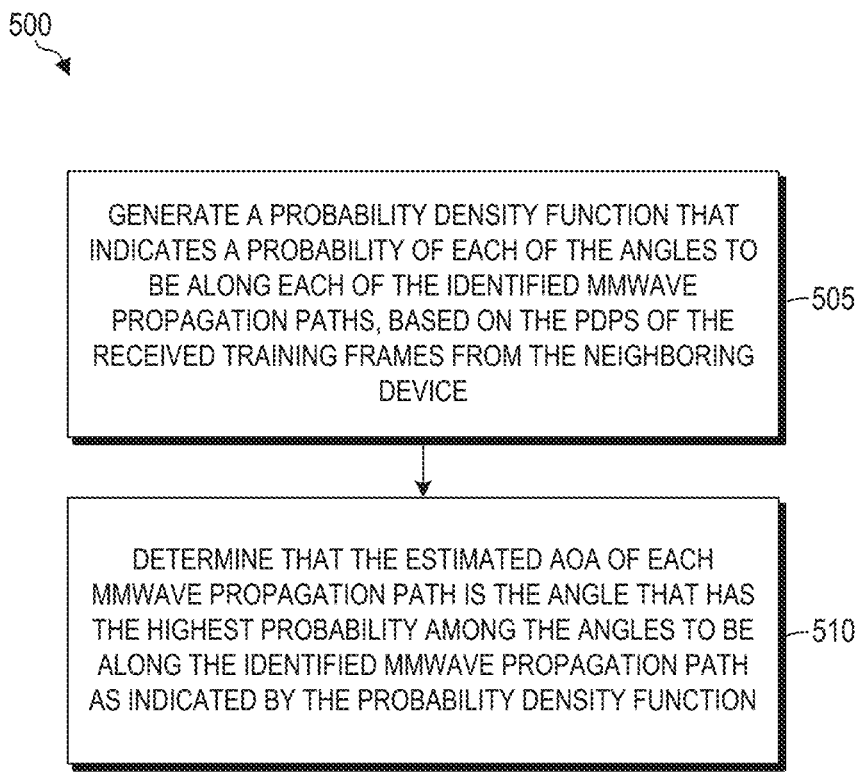
FIG. 5 is a flowchart of an example method for high spatial reuse for mmWave Wi-Fi.

FIG. 5 is a flowchart of an example method 500 for high spatial reuse for mmWave Wi-Fi. Although execution of method 500 is described below with reference to network device 100, other network devices suitable for the execution of method 500 may be utilized. Additionally, implementation of method 500 is not limited to such examples. While only two blocks are shown in method 500, method 500 may include other actions described herein. Additionally, although the blocks are shown in an order, blocks depicted in FIG. 5 may be performed in any order and at any time. Also, some of the blocks shown in method 500 may be omitted without departing from the spirit and scope of this disclosure.

At block 505 of method 500, estimated AoA determination instructions 124, when executed, may generate a probability density function that indicates a probability of each of the identified mmWave propagation paths to be along each of a plurality of angles, based on the PDPs of the received beam training frames from the neighboring device. In addition, estimated AoA determination instructions 124 to generate the probability density function may comprise instructions to, for each of the identified mmWave propagation paths: for each of the mmWave beams of the identified mmWave propagation path: (1) determine, for each of the angles, a beam directivity gain of a predetermined radiation pattern of the received beam training frames along the angle, (2) determine a path strength gain of the identified mmWave propagation path using the mmWave beam, based on the PDPs of the received beam training frames from the neighboring device, and (3) compute, for each of the angles, a product of the beam directivity gain along the angle and the path strength gain of the identified mmWave propagation path using the mmWave beam.

At block 510 of method 500, estimated AoA determination instructions 124, when executed, may determine, for each of the identified mmWave propagation paths, that the estimated AoA of the identified mmWave propagation path is one of the angles that has the highest probability among the angles to be along the identified mmWave propagation path as indicated by the probability density function.

Figure 6:
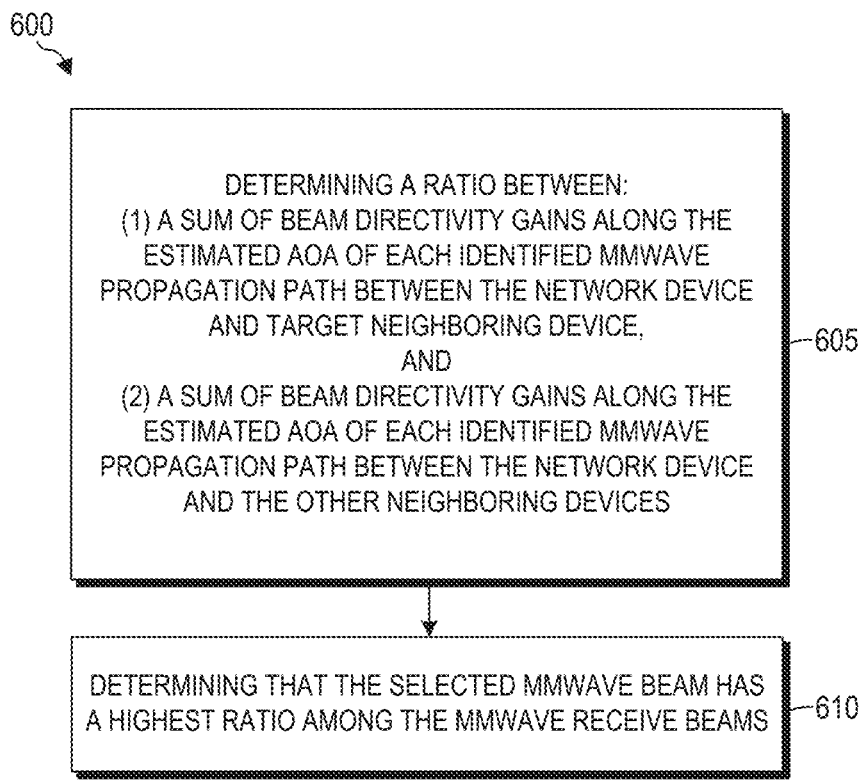
FIG. 6 is a flowchart of an example method for high spatial reuse for mmWave Wi-Fi.

FIG. 6 is a flowchart of an example method 600 for high spatial reuse for mmWave Wi-Fi. Although execution of method 600 is described below with reference to network device 100, other network devices suitable for the execution of method 600 may be utilized. Additionally, implementation of method 600 is not limited to such examples. While only two blocks are shown in method 600, method 600 may include other actions described herein. Additionally, although the blocks are shown in an order, blocks depicted in FIG. 6 may be performed in any order and at any time. Also, some of the blocks shown in method 600 may be omitted without departing from the spirit and scope of this disclosure.

At block 605 of method 600, path selection instructions 126, when executed, may determine, for each of the mmWave beams, a ratio between: (1) a sum of beam directivity gains along the estimated AoA of each identified mmWave propagation path between network device 100 and the target neighboring device; and (2) a sum of beam directivity gains of along the estimated AoAs of each identified mmWave propagation paths between network device 100 and every other neighboring device in the set. For instance, the determined ratio may be a ratio between: (1) a sum of beam directivity gains of the received beam training frames along the estimated AoA of each identified mmWave propagation path between network device 100 and the target neighboring device; and (2) a sum of beam directivity gains of the received beam training frames along the estimated AoAs of each identified mmWave propagation paths between network device 100 and every other neighboring device in the set.

At block 610 of method 600, path selection instructions 126, when executed, may determine that the selected one of the mmWave beams has a highest value of the ratio among the ratios of the mmWave beams.

Figure 7:
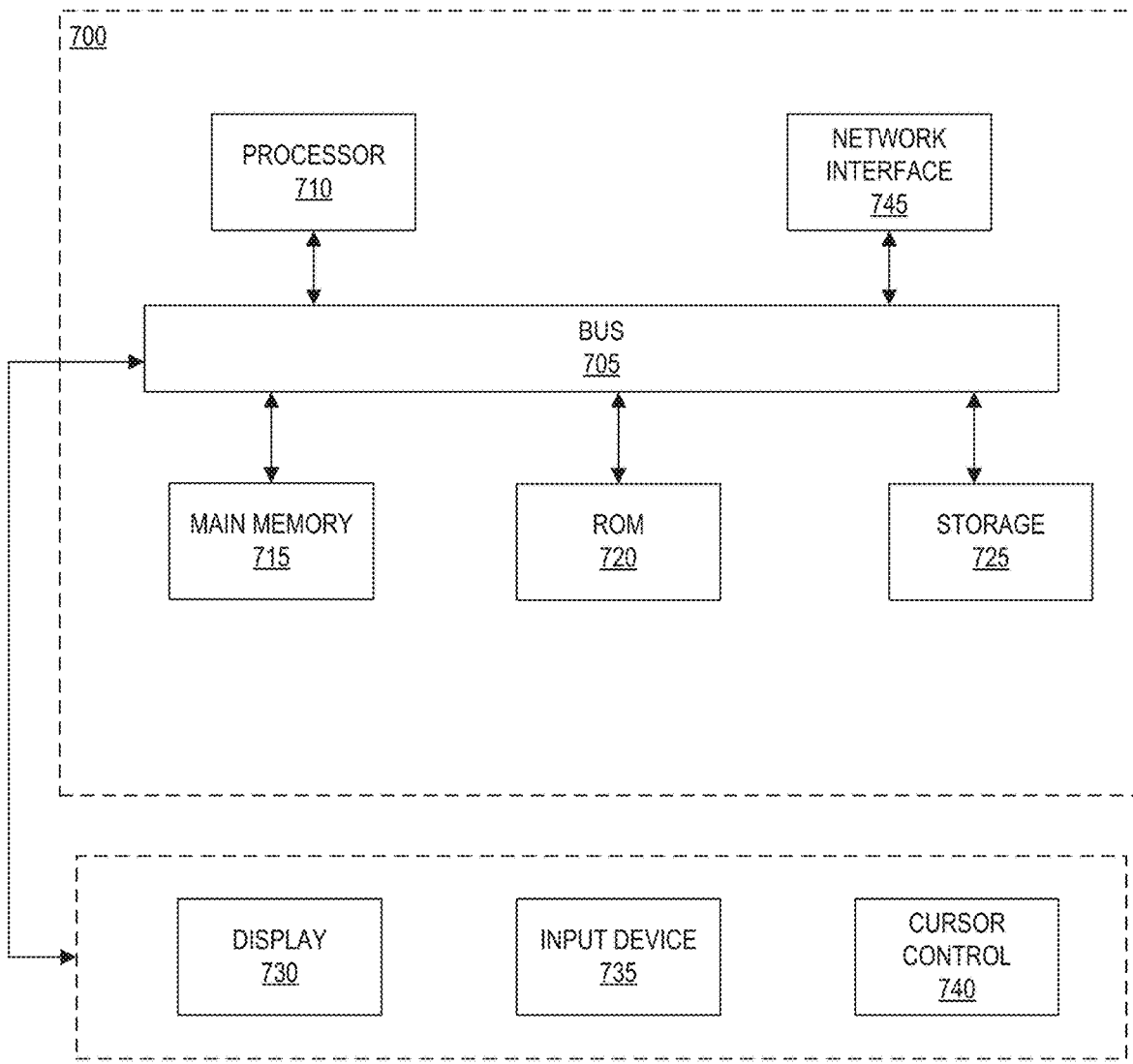
FIG. 7 is a block diagram of an example computer system in which various embodiments described herein may be implemented for high spatial reuse for mmWave Wi-Fi.

FIG. 7 is a block diagram of an example computer system 700 in which various embodiments described herein may be implemented for high spatial reuse for mmWave Wi-Fi.

Computer system 700 includes bus 705 or other communication mechanism for communicating information, at least one hardware processor 710 coupled with bus 705 for processing information. At least one hardware processor 710 may be, for example, at least one general purpose microprocessor.

Computer system 700 also includes main memory 715, such as random access memory (RAM), cache, other dynamic storage devices, or the like, or a combination thereof, coupled to bus 705 for storing information and one or more instructions to be executed by at least one processor 710. Main memory 715 also may be used for storing temporary variables or other intermediate information during execution of one or more instructions to be executed by at least one processor 710. Such one or more instructions, when stored on storage media accessible to at least one processor 710, render computer system 700 into a special-purpose machine that is customized to perform the operations specified in the one or more instructions.

Computer system 700 may further include read only memory (ROM) 720 or other static storage device coupled to bus 705 for storing static of one or more instructions to be executed by at least one processor 710. Such one or more instructions, when stored on storage media accessible to at least one processor 710, render computer system 700 into a special-purpose machine that is customized to perform the operations specified in the one or more instructions.

Computer system 700 may further include information and one or more instructions for at least one processor 710. At least one storage device 725, such as a magnetic disk, optical disk, or USB thumb drive (Flash drive), or the like, or a combination thereof, may be provided and coupled to bus 705 for storing information and one or more instructions.

Computer system 700 may further include display 730 coupled to bus 705 for displaying a graphical output to a user. The computer system 700 may further include input device 735, such as a keyboard, camera, microphone, or the like, or a combination thereof, coupled to bus 705 for providing an input from a user. Computer system 700 may further include cursor control 740, such as a mouse, pointer, stylus, or the like, or a combination thereof, coupled to bus 705 for providing an input from a user.

Computer system 700 may further includes at least one network interface 745, such as a network interface controller (NIC), network adapter, or the like, or a combination thereof, coupled to bus 705 for connecting computer system 700 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 based on (e.g., in response to) at least one processor 710 executing one or more sequences of one or more instructions contained in main memory 715. Such one or more instructions may be read into main memory 715 from another storage medium, such as at least one storage device 725. Execution of the sequences of one or more instructions contained in main memory 715 causes at least one processor 710 to perform the process steps described herein. In alternative embodiments, hard-wired circuitry may be used in place of or in combination with software instructions.

In examples described herein, the term "Wi-Fi" is meant to encompass any type of wireless communications that conforms to any IEEE 802.11 standards, whether 802.11ac, 802.11ax, 802.11a, 802.11n, 802.11ad, 802.11ay, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 60 GHz band for 802.11ad or 802.11ay) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, "throughput" refers to a rate of successful data transmission across a communication link (e.g., a wireless link). Throughput may depend on a bandwidth of the communication link, a maximum rate of data transmission (i.e., peak data rate or peak bit rate) across the communication link, or a combination thereof. Moreover, throughput may depend on an amount of data packet loss during data transmission across the communication link. For example, a network device may increase throughput, and thereby improve performance, by increasing bandwidth of a communication link, reducing data packet loss during data transmission across the communication link, or a combination thereof. The throughput of a wireless link may be diminished by degradation of signal quality (e.g., free space path loss) of wireless signals transmitted and/or received to establish the wireless link.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising, identifying, by a network device, a plurality of millimeter-wave (mmWave) propagation paths between the network device and a set of neighboring devices wherein the set includes a target neighboring device, based on power delay profiles (PDPs) of beam training frames received by the network device from each of the neighboring devices utilizing a plurality of mmWave beams;

wherein identifying the plurality of mmWave propagation paths between the network device and the set of neighboring devices comprises:

generating, by the network device, an aggregate path profile of the PDPs of the received beam training frames utilizing the mmWave beams, wherein the aggregate path profile maps an aggregate signal strength of the received beam training frames of the PDPs as a function of time delay;

identifying, by the network device, a number of impulses of the aggregate path profile at which the aggregate signal strength exceeds a predetermined threshold; and determining, by the network device, that a total number of the mmWave propagation paths is equal to the number of impulses of the aggregate path profile;

determining, by the network device for each of neighboring devices in the set, an estimated angle of arrival (AoA) of each identified mmWave propagation path between the network device and the neighboring device, based on the PDPs of the received beam training frames from the neighboring device;

selecting, by the network device, one of the mmWave beams that maximizes a signal to interference and noise ratio (SINR) along the estimated AoA of each identified mmWave propagation path between the network device and the target neighboring device; and communicating, by the network device, with the target neighboring device utilizing the selected mmWave beam.

2. The method of claim 1, wherein the selected mmWave beam minimizes interference from an other neighboring network devices in the set than the target neighboring device along the estimated AoA of each identified mmWave propagation path between the network device and the other neighboring devices in the set than the target neighboring device.

3. The method of claim 1, wherein generating the aggregate path profile comprises:

generating, by the network device, each of the PDPs, wherein each of the PDPs maps a signal strength of the received beam training frames by the network device utilizing one of the mmWave beams as a function of time delay;

identifying, by the network device for each of the PDPs, a number of impulses of the PDP at which the signal strength exceeds another predetermined threshold and a time delay associated with each impulse; and generating, by the network device, the aggregate path profile by aligning the PDPs based on the time delays of the impulses of the PDPs and superimposing the aligned PDPs.

4. The method of claim 1, wherein determining the estimated AoA of each identified mmWave propagation path between the network device and the neighboring device comprises:

generating, by the network device, a probability density function that indicates a probability of each of the identified mmWave propagation paths to be along each of a plurality of angles, based on the PDPs of the received beam training frames from the neighboring device; and determining, by the network device for each of the identified mmWave propagation paths, that the estimated AoA of the identified mmWave propagation path corresponds to at least one of the angles that has a highest probability among the angles to be along the identified mmWave propagation path as indicated by the probability density function.

5. The method of claim 4, wherein generating the probability density function comprises:

for each of the identified mmWave propagation paths:
  for each of the mmWave beams of the identified mmWave propagation path:
    determining, by the network device for each of the angles, a beam directivity gain of a predetermined radiation pattern of the received beam training frames along the angle;
    determining, by the network device, a path strength gain of the identified mmWave propagation path utilizing the mmWave beam, based on the PDPs of the received beam training frames from the neighboring device; and
    computing, by the network device for each of the angles, a product of the beam directivity gain along the angle and the path strength gain of the identified mmWave propagation path utilizing the mmWave beam.

6. The method of claim 1, wherein selecting the one of the mmWave beams comprises:

determining, by the network device for each of the mmWave beams, a ratio between:
(1) a sum of beam directivity gains along the estimated AoA of each identified mmWave propagation path between the network device and the target neighboring device; and
(2) a sum of beam directivity gains along the estimated AoA of each identified mmWave propagation path between the network device and every other neighboring device in the set; and determining, by the network device, that the selected one of the mmWave beams has a highest value of the ratio among the ratios of the mmWave beams.

7. The method of claim 1, wherein communicating with the target neighboring device utilizing the selected mmWave beam comprises:

receiving, by the network device from the target neighboring device, a mmWave signal along the estimated AoA corresponding to the selected mmWave beam.

8. The method of claim 1, wherein communicating with the target neighboring device utilizing the selected mmWave beam comprises:

transmitting, by the network device to the target neighboring device, a mmWave signal along the estimated AoA corresponding to the selected mmWave beam.

9. The method of claim 1, wherein the network device communicates with the target neighboring device utilizing a mmWave operating channel according to one of the IEEE 802.11ad and 802.11ay standards.

10. An article comprising at least one non-transitory machine-readable storage medium comprising instructions executable by at least one processing resource of a network device to:

identify a plurality of millimeter-wave (mmWave) propagation paths between the network device and a set of neighboring devices wherein the set includes a target neighboring device, based on power delay profiles (PDPs) of beam training frames received by the network device from each of the neighboring devices utilizing a plurality of mmWave beams;

determine, for each of neighboring devices in the set, an estimated angle of arrival (AoA) of each identified mmWave propagation path between the network device and the neighboring device, based on the PDPs of the received beam training frames from the neighboring device;

wherein the instructions to determine the estimated AoA of each identified mmWave propagation path between the network device and the neighboring device comprise instructions to:

generate a probability density function that indicates a probability of each of the identified mmWave propagation paths to be along each of a plurality of angles, based on the PDPs of the received beam training frames from the neighboring device; and determine, for each of the identified mmWave propagation paths, that the estimated AoA of the identified mmWave propagation path corresponds to at least one of the angles that has a highest probability among the angles to be along the identified mmWave propagation path as indicated by the probability density function:

select one of the mmWave beams that maximizes a signal to interference and noise ratio (SINR) along the estimated AoA of each identified mmWave propagation path between the network device and the target neighboring device; and communicate with the target neighboring device utilizing the selected mmWave beam.

11. The article of claim 10, wherein the instructions to identify the plurality of mmWave propagation paths between the network device and the set of neighboring devices comprise instructions to:

generate each of the PDPs, wherein each of the PDPs maps a signal strength of the received beam training frames by the network device utilizing one of the mmWave beams as a function of time delay;

identify, for each of the PDPs, a number of impulses of the PDP at which the signal strength exceeds a first predetermined threshold and a time delay associated with each impulse; and generate an aggregate path profile by aligning the PDPs based on the time delays of the impulses of the PDPs and superimposing the aligned PDPs, wherein the aggregate path profile maps an aggregate signal strength of the received beam training frames of the PDPs as a function of time delay;

identify a number of impulses of the aggregate path profile at which the aggregate signal strength exceeds a second predetermined threshold; and determine that a total number of the mmWave propagation paths is equal to the number of impulses of the aggregate path profile.

12. The article of claim 10, wherein the instructions to select the one of the mmWave directional beams comprise instructions to:

determine, for each of the mmWave beams, a ratio between:
(1) a sum of beam directivity gains along the estimated AoA of each identified mmWave propagation path between the network device and the target neighboring device; and
(2) a sum of beam directivity gains along the estimated AoA of each identified mmWave propagation path between the network device and every other neighboring device in the set than the target neighboring device; and determine that the selected one of the mmWave beams has a highest value of the ratio among the ratios of the mmWave beams.

13. The article of claim 10, wherein the instructions to communicate with the target neighboring device utilizing the selected mmWave beam comprise instructions to:

receive, from the target neighboring device, a first mmWave signal along the estimated AoA corresponding to the selected mmWave beam; and transmit, to the target neighboring device, a second mmWave signal along the estimated AoA corresponding to the selected mmWave beam.

* * * * *